United States Patent [19]

James et al.

[11] 4,329,523
[45] May 11, 1982

[54] PROCESS FOR THE NITRATION OF METHANE

[75] Inventors: Richard L. James, Monroe, La.; Richard S. Egly, West Terre Haut, Ind.

[73] Assignee: International Minerals & Chemical Corp., Terre Haute, Ind.

[21] Appl. No.: 182,872

[22] Filed: Sep. 2, 1980

[51] Int. Cl.³ .................. C07C 76/02; C07C 79/04
[52] U.S. Cl. .................................. 568/948; 568/947; 260/688
[58] Field of Search ........... 568/948, 947; 260/467, 260/688

[56] References Cited

U.S. PATENT DOCUMENTS

| | | | |
|---|---|---|---|
| 2,161,475 | 6/1939 | Landon | 568/948 |
| 2,164,774 | 7/1939 | Landon | 568/948 |
| 2,418,241 | 4/1947 | Stencel et al. | 568/948 |
| 2,512,587 | 6/1950 | Stencel | 568/948 |
| 2,737,522 | 3/1956 | Nilsson | 260/467 |
| 2,885,447 | 5/1959 | McKinnis et al. | 568/948 |
| 3,111,538 | 11/1963 | Stow, Jr. | 260/467 |
| 3,378,596 | 4/1968 | Toops, Jr., et al. | 568/948 |

FOREIGN PATENT DOCUMENTS 965419   7/1964   United Kingdom ............... 568/947

*Primary Examiner*—Teddy S. Gron
*Attorney, Agent, or Firm*—Robert H. Dewey

[57] ABSTRACT

An improved process for the vapor phase nitration of methane comprising delivering preheated (1000°–1250° F.) methane at a flow rate of not less than 20,000 SCFH into a reaction chamber of 3.334 inches in diameter maintained at about 950° F., delivering nitric acid into the reaction chamber through a plurality of orifices perpendicularly mounted with respect to the methane flow, whereat the nitric acid vaporizes, mixes with the methane and reacts therewith, and exiting the reaction mixture after a reaction time of 30 to 250 milliseconds and recovering nitromethane from the reaction mixture.

6 Claims, 3 Drawing Figures

PROCESS FOR THE NITRATION OF METHANE

BACKGROUND OF THE INVENTION

This invention relates to the vapor phase nitration of hydrocarbons. In a particular aspect, this invention relates to an improved process for the vapor phase nitration of methane to produce nitromethane.

The successful vapor phase nitration of methane was first described in U.S. Pat. Nos. 2,161,475 and 2,164,774, issued to G. K. Landen. Both of these patents described the nitration of methane with nitric acid by passing the vaporized reactants through open tubular reactors which were externally heated to maintain a reaction temperature of about 707°–1022° F. for a contact time ranging between about 0.005 and 1 second.

The use of an externally heated tubular reactor is, however, disadvantageous from the standpoint of efficient heat transfer. A considerable length of the reactor is necessarily devoted to preheating the gas to reaction temperature. Also, when the reaction temperature is raised, the exothermic reaction causes a further temperature rise which is difficult to control, especially with externally heated reactors. Moreover, it is difficult to correlate temperature and contact time in such a manner as to maintain optimum relationship between those variables. It will be understood that if the temperature exceeds the optimum range, undesirable side reactions will proceed at a relatively faster rate than that at the optimum temperature. If the temperature falls short of the optimum range, the reaction may cease.

One of the more successful recent attempts at the nitration of methane involved the passage of a mixture of nitric acid and a large excess of methane in the gaseous phase and at an average pressure of 100 psig through a glass tube 3 millimeters in diameter and 180 feet long immersed in a salt bath at a temperature of 410°–430° C. The reaction time was about 1.0 second and the nitromethane yields amounted to approximately 20%, based upon the nitric acid fed to the system. The exceedingly small diameter and great length of reaction tube was required to supply sufficient heat transfer per area per reaction space volume to maintain approximately isothermal conditions during the reaction. The required contact time of 0.1 to 1.0 second necessarily requires an exceedingly high gas velocity and, therefore, unduly high differential pressure across the small reactor tubes. The use of such small tubular reactors of great length is disadvantageous because of the large pressure drop though the reactor. Great difficulty is also often encountered through the blocking and breakage of such reactors.

More recently, R. S. Egly and E. E. Toops, Jr., U.S. Pat. No. 3,378,596 disclosed a process for nitrating alkanes using a jet engine or a rocket engine as a reactor. This process had the advantage of providing very short reaction time of about 50 milliseconds. Also, the bipropellant injectors of such engines are designed to provide rapid atomization of the nitric acid. Egly et al taught the use of several radially-disposed, diametrically opposed inlet injectors which inject a plurality of streams of nitric acid into the flowing stream of methane. Rapid quenching of the reaction was provided by passing the reaction mixture through the exhaust nozzle of the engine. A sudden expansion of the reaction products from the pressure of the reaction chamber, i.e. 60 to 800 psig, to atmospheric pressure immediately terminates the reaction.

Although this process was quite successful, it was energy inefficient because the unreacted methane and oxides of nitrogen had to be recompressed to be efficiently recovered or beneficially utilized. Also, since it operated at essentially atmospheric exit pressure, excessively large and costly coolers, scrubbers, and associated facilities would be required.

SUMMARY OF THE INVENTION

It is an object of this invention to provide an improved process for the nitration of methane.

It is another object of this invention to provide an improved process for the nitration of methane using a modified reactor and injectors therefor.

Other objects of this invention will be apparent to those skilled in the art.

It is the discovery of the present invention to provide an improved single-stage process for the vapor phase nitration of methane. The improved process comprises the steps of preheating methane to from 1000°–1250° F. and injecting the methane through a Venturi throat into a reaction chamber, the temperature of which is from about 800° to about 1000° F. while simultaneously injecting dilute aqueous nitric acid into the Venturi throat through a plurality of orifices perpendicularly mounted to the methane flow for a reaction time of 250 to 30 milliseconds respectively. The reaction mixture is then passed from the reactor to a quench chamber where the mixture is promptly cooled and the reaction ceases.

DETAILED DESCRIPTION

The methane employed in the practice of this invention may be from any suitable source, either pure or impure, e.g. natural gas. Preferably the methane has a low content of higher hydrocarbons such as ethane and propane. These higher hydrocarbons are selectively attacked by the nitric acid, and at the temperature of the reactor, are largely oxidized instead of nitrated. Hence the yield based on nitric acid is adversely affected by the presence of higher hydrocarbons. The methane is injected into the reactor at a flow rate of not less than 20,000 standard cubic feet per hour, preferably more.

The nitric acid employed in the practice of this invention is more dilute than previously taught. For example, Egly et al, U.S. Pat. No. 3,378,596 taught a concentration of 60–100%. However, in the instant process, it has been found that even more dilute acid is advantageous. A range of about 45–55% by weight is preferred and about 50% is particularly preferred. The liquid nitric acid should not contact the wall of the reactor.

Generally a molar excess of methane, e.g. 5 to 30 moles of methane per mole of nitric acid is employed in the reaction, and 9–20 is preferred. A mole ratio of 12–15 is particularly preferred. Part of the excess methane can be efficiently recycled if desired, but it is expedient to simply use a purge stream as a fuel source for other purposes.

The reaction temperature and reaction time are interrelated. At about 800° F., a reaction time of 250 milliseconds is preferred, whereas, at about 1000° F., a reaction time of about 30 milliseconds is preferred. The preferred temperature is from about 900°–950° F. for a reaction time of about 50 milliseconds.

After the reaction mixture has exited from the reaction chamber and has been cooled to, e.g. about 70°–120° F., it is delivered to a water scrubbing unit. The liquid phase is then delivered to a decanter where the nitromethane separates from the water. It is then purified as known in the art. The aqueous phase contains considerable dissolved nitromethane which is recovered by known methods.

In the scrubbing unit, volatile components such as excess methane are separated from the liquid products and these volatile gases may be partially recycled to the preheater and partially used as a fuel source as previously mentioned.

Figure 2:
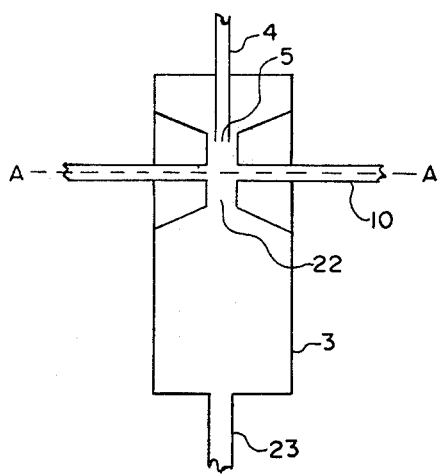
FIG. 2 shows the reaction chamber with the Venturi throat and the nitric acid orifices.
Figure 3:
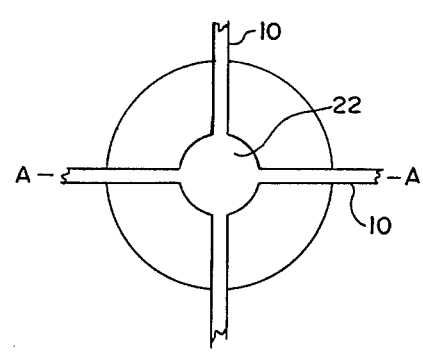
FIG. 3 is a cross-section taken at A—A of FIG. 2 and shows four nitric acid injection orifices.

It is an embodiment of this invention that the methane feed be injected into the reactor through a Venturi nozzle where it contacts the nitric acid which is being injected perpendicularly to the methane flow. This can be better understood by reference to FIG. 2. The reactor 3 is constructed of corrosion-resistant material and is preferably at least 3.334 inches in internal diameter so that liquid nitric acid will not contact the reactor wall. The length of the reactor should be such as to provide a ratio of length to diameter of 5–25, preferably 6–12. The preheated methane is injected through line 4 through injector 5, which can conveniently be provided by the open end of line 4. Injector 5 is located just inside the constricted throat 22 and above the nitric acid inlets 10 of which there are a plurality (FIG. 3) diametrically opposed. The size of the orifice, and the number thereof, has not been found to be critical. Generally from 2–6 orifices may be conveniently used, having openings of from about 0.05 inch to about 0.20 inch. The size of the orifice must be small enough and the acid velocity must be high enough to prevent liquid acid from running down the side of the throat.

Pressure level is not critical. Generally the pressure in the reactor will be at least 100–150 psig or more. It will, however, be variable due to temperature changes, etc. The reaction mixture exits from the bottom of the reactor at 23.

The following example will serve to illustrate the invention.

EXAMPLE

Figure 1:
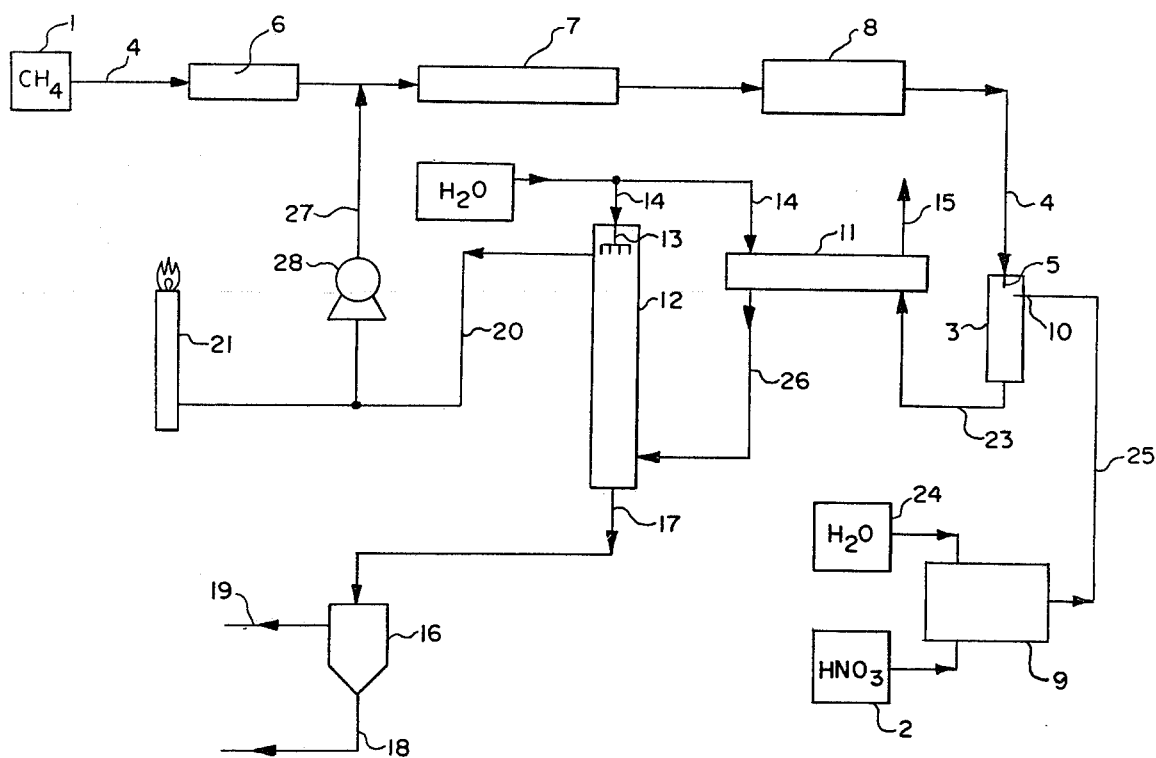
FIG. 1 is a schematic diagram of the process.

This example will be more fully understood by reference to FIG. 1 showing the flow sheet of the instant process.

In the instant process methane and nitric acid are stored in vessels 1 and 2. The methane from vessel 1 is supplied under pressure to the reaction chamber 3 (the nitrator) through line 4 by way of injector 5. It is heated successively to about 350° F. in preheater 6, then to about 850° F. in preheater 7 and finally to about 1000° to about 1250° F. in preheater 8. It is understood, of course, that a single heating stage can be used instead of the three described. The nitric acid from vessel 2 is pumped into flow control chamber 9 where it is mixed with water from water source 24 to the desired proportion and thence it is passed to orifice 10 by line 25. The methane enters nitrator 3 at high velocity and temperature and that plus the heat of reaction vaporizes the nitric acid which becomes well mixed with the methane. The reaction products are exited from the nitrator through line 23 into chamber 11 to quench the reaction and thence to scrubber 12 through line 26. The products are further cooled in scrubber 12 by cold water sprays 13 from water line 14. Chamber 11 is cooled by chilled water from line 14. Heated water exits at 15 for recycle or waste. The cooled reaction products including nitromethane and water are conducted from scrubber 12 to decanter 16 by way of line 17. The nitromethane is recovered through line 18 and water is removed through line 19.

When unreacted nitric acid is present in the reaction product, it may be advantageous to neutralize the reaction product, e.g. with sodium carbonate, to a pH approaching 7 to avoid deleterious effects of the nitric acid on the desired nitromethane. Alternatively, the reaction product can be cooled to avoid the such effects. Volatile components from the reaction product, primarily unreacted methane, are conducted from scrubber 12 through line 20 to flare 21, which can be a burner unit for a boiler or heater, or the stream, or portion thereof, can be recycled through line 27 and pump 28 to preheater 6 or 7.

We claim:

1. An improved process for the single-stage nitration of methane in the vapor phase comprising (a) heating the methane to a temperature in the range of 1000° to 1250° F., (b) injecting the methane into a reactor through the throat of a Venturi, (c) simultaneously injecting dilute nitric acid through a plurality of orifices into the Venturi throat and perpendicularly to the methane flow, (d) reacting the methane and nitric acid at a temperature of about 800° F. to about 1000° F. or more for a reaction time of 250 to 30 milliseconds, respectively.

2. The process of claim 1 wherein the methane is injected into the reactor at a rate of not less than 20,000 standard cubic feet per hour.

3. The process of claim 1 wherein the reactor is of such a diameter that liquid nitric acid does not contact the walls of the reactor.

4. The process of claim 3 wherein the reactor is of 3.334 inches or more in diameter.

5. The process of claim 1 wherein the nitric acid is injected through from 2 to 6 or more orifices diametrically opposed and of such diameter to prevent liquid nitric acid from contacting the walls of the Venturi throat.

6. The process of claim 1 wherein the reaction temperature is about 900°–950° F. at a reaction time of about 50 milliseconds.

\* \* \* \* \*